US008752482B2

(12) United States Patent
Esterman

(10) Patent No.: US 8,752,482 B2
(45) Date of Patent: Jun. 17, 2014

(54) HAND TOOL FOR SQUEEZING, CHOPPING; AND PUREEING FOOD

(76) Inventor: Margaret P. Esterman, Salt Lake City, UT (US)

(*) Notice: Subject to any disclaimer, the term of this patent is extended or adjusted under 35 U.S.C. 154(b) by 1239 days.

(21) Appl. No.: 11/828,672

(22) Filed: Jul. 26, 2007

(65) Prior Publication Data
US 2008/0028951 A1    Feb. 7, 2008

Related U.S. Application Data

(60) Provisional application No. 60/834,332, filed on Jul. 31, 2006.

(51) Int. Cl.
*A47J 44/00* (2006.01)
(52) U.S. Cl.
USPC .......................................... 99/537; 241/169.2
(58) Field of Classification Search
USPC ........ 99/537; 15/245, 235.4; 7/113, 170, 110; 220/DIG. 13; D8/45, 62; 425/12; 30/142, 149, 169, 172, 123; 241/169.2
See application file for complete search history.

(56) References Cited

U.S. PATENT DOCUMENTS

| | | | | |
|---|---|---|---|---|
| 604,965 | A | * | 5/1898 | Cartwright ........................ 7/112 |
| D49,368 | S | * | 7/1916 | Osterbauer .................... D7/691 |
| 1,228,821 | A | * | 6/1917 | Reynolds ........................... 294/7 |
| 2,253,116 | A | * | 8/1941 | Findlay ............................ 172/13 |
| 2,437,316 | A | * | 3/1948 | Gambino et al. ........... 15/236.01 |
| 3,224,091 | A | * | 12/1965 | Scigliano ........................ 30/142 |
| 3,686,703 | A | * | 8/1972 | Ray ............................. 15/235.4 |
| 4,627,128 | A | * | 12/1986 | Shea .......................... 15/236.07 |
| 5,706,546 | A | * | 1/1998 | Utley ......................... 15/236.01 |
| 6,012,750 | A | * | 1/2000 | Swartz .............................. 294/7 |
| D437,747 | S | * | 2/2001 | Kwok ............................ D7/682 |
| 6,415,926 | B1 | * | 7/2002 | Long ............................ 206/575 |
| 6,612,379 | B1 | * | 9/2003 | Timmons ..................... 172/375 |
| D513,813 | S | * | 1/2006 | Avery ........................ D28/44.1 |
| D612,694 | S | | 3/2010 | Eide et al. |
| 2005/0160807 | A1 | * | 7/2005 | Kilduff et al. .................. 73/426 |

FOREIGN PATENT DOCUMENTS

GB           2171634 A  *  9/1986

* cited by examiner

*Primary Examiner* — Jianying Atkisson
(74) *Attorney, Agent, or Firm* — Millen, White, Zelano & Branigan, P.C.

(57) ABSTRACT

The present invention relates to a hand tool for squeezing, chopping and pureeing food. The hand tool allows a user to chop, drain and/or puree food with one tool and can be used in conjunction with an ordinary bowl or colander. The hand tool of the present invention has a head portion having a convex pressing surface and a handle portion, allowing a user to grips the end of the handle and apply force directly over the pressing surface to squeeze food and/or expel moisture. A scraping edge allows the user to scrape food against the holes in a strainer or colander or to scrape particles from the sides of a bowl. A blade is attached to the head portion of the tool and can be used to chop and puree food.

3 Claims, 4 Drawing Sheets

HAND TOOL FOR SQUEEZING, CHOPPING; AND PUREEING FOOD

This application claims the benefit of the filing date of U.S. Provisional Application Ser. No. 60/834,332 filed 31 Jul. 2006.

The present invention relates to a hand tool for squeezing, chopping and pureeing food. The tool allows a user to chop, drain and/or puree food with one tool and can be used in conjunction with an ordinary bowl or colander.

Many culinary recipes call for hand squeezing of cooked greens, such as spinach or chard in order to extract all the liquids from the food. With hand squeezing, a cook often has to wait several minutes until the food is cool enough to comfortably handle before continuing with the recipe. In addition, hand squeezing is a messy procedure, as bits of the food always stick to the hands. Recipes often advise hand squeezing of cooked greens and salted foods (e.g., cucumbers, eggplant and squash) because currently available implements such as spoons, ladles and spatulas don't do a good job of squeezing the liquid out of the food. The handle placement of spoons, ladles and spatulas is generally off to the side of the pressing surfaces and there isn't enough force applied to the food for adequate squeezing, so too much liquid remains in the food. Excess liquid can have an adverse effect in some recipes.

Many pestles and mashers are suitable for pressing food and pureeing. However none of the commercially available devices have blades and the shapes are not optimized for use with a colander or large bowl.

SUMMARY

The hand tool of the present invention has a blade, which allows the user to chop the food, and a scraping edge that allows the user to scrape food along the sides of the bowl or colander. Thus, a user can press, chop and puree with one tool in the same colander or bowl thereby eliminating the need to wash multiple implements, such as cutting boards, ricers, or food mills.

The hand tool of the present invention has a head (1) portion having a convex pressing surface (10) and a handle (40) portion. A user holds the grip (41) end of the handle (40) and applies force directly over the pressing surface to squeeze food such as, for example, cooked greens against a colander surface to remove the moisture. Thus, allowing moisture to be expelled through the holes of the colander. At the junction of the lower sidewall (15) of the convex pressing surface (10) and the underside (2) of the head (1) is the scraping edge (20). This edge scrapes food against the holes in a strainer or colander. It can also be used to scrape food particles from the sides of a bowl. A blade (30) is attached to the head portion of the tool. The blade can be used to chop and puree food. By nature of the curved blade, the user can chop in an ergonomically desirable rolling motion.

DESCRIPTION

Figure 1:
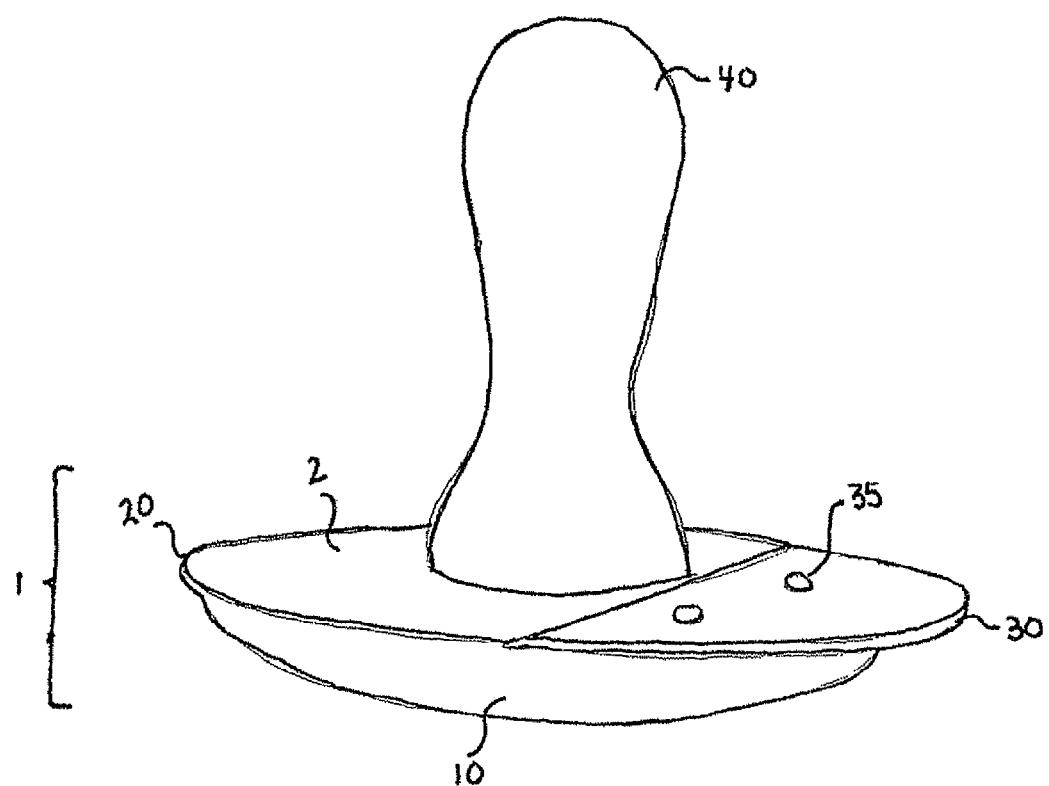
FIG. 1—shows a representative embodiment of the hand tool having a head (1) and a handle (40). A convex pressing surface (10) forms the top of the head. The bottom of the head has an underside (2). The handle (40) is attached to the underside (2) of the head (1). A blade (30) extends radially away from the head and extends beyond the convex pressing surface (10). A scraping edge (20) is formed at the juncture of the convex pressing surface (10) and the underside (2). The blade is parallel to the underside (2).
Figure 2:
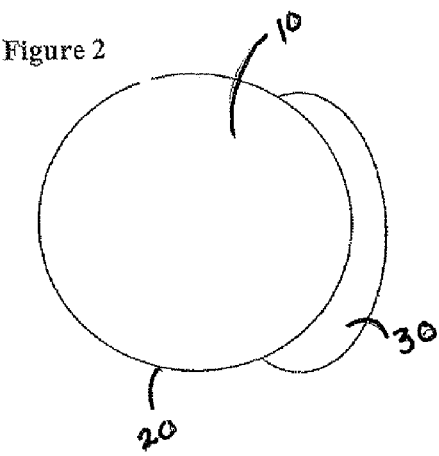
FIG. 2—shows the hand tool with a convex pressing surface (10) as viewed from above.
Figure 3:
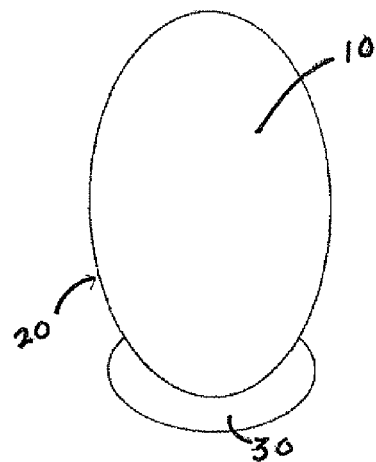
FIG. 3—shows the hand tool with a non-circular convex pressing surface (10) as viewed from above.
Figure 4:
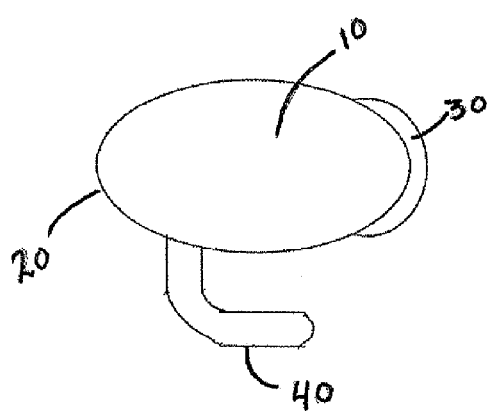
FIG. 4—shows the hand tool with a pistol like grip handle (40) attached to the under side (2) of the head ((1).
Figure 5:
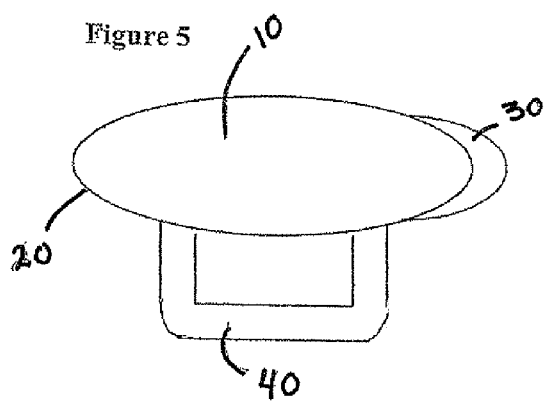
FIG. 5—shows the hand tool with a handle (40) that's attached to the underside (2) at two points of attachment.
Figure 6:
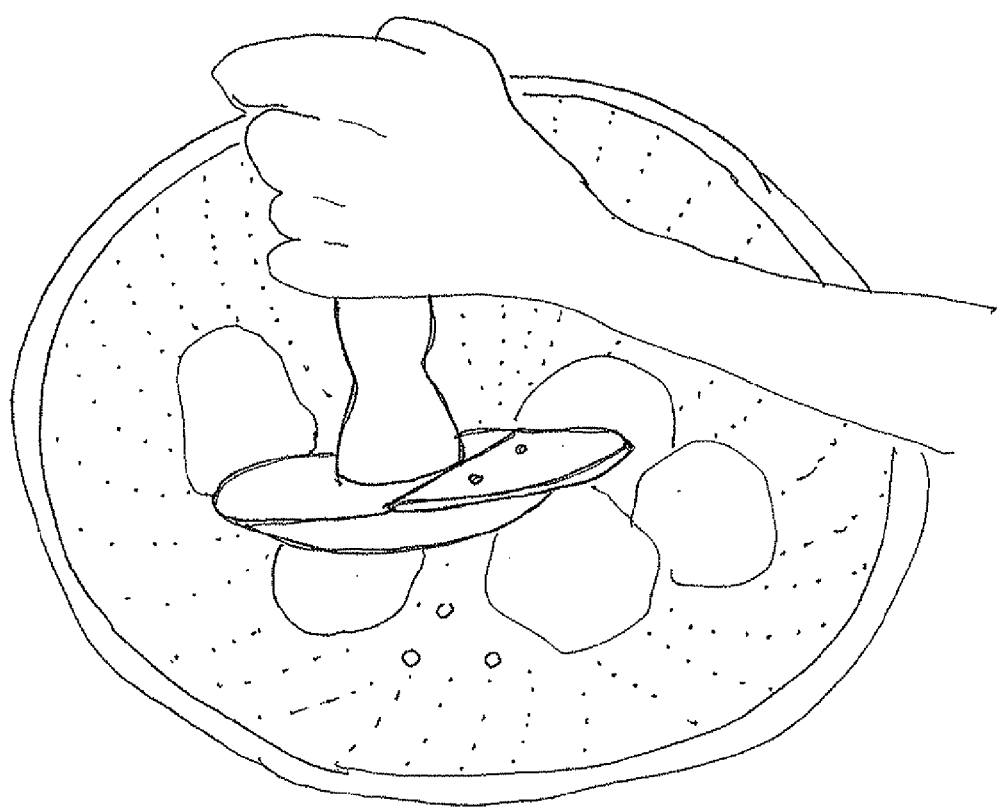
FIG. 6—shows a hand tool of the present invention in use in a colander.
Figure 7:
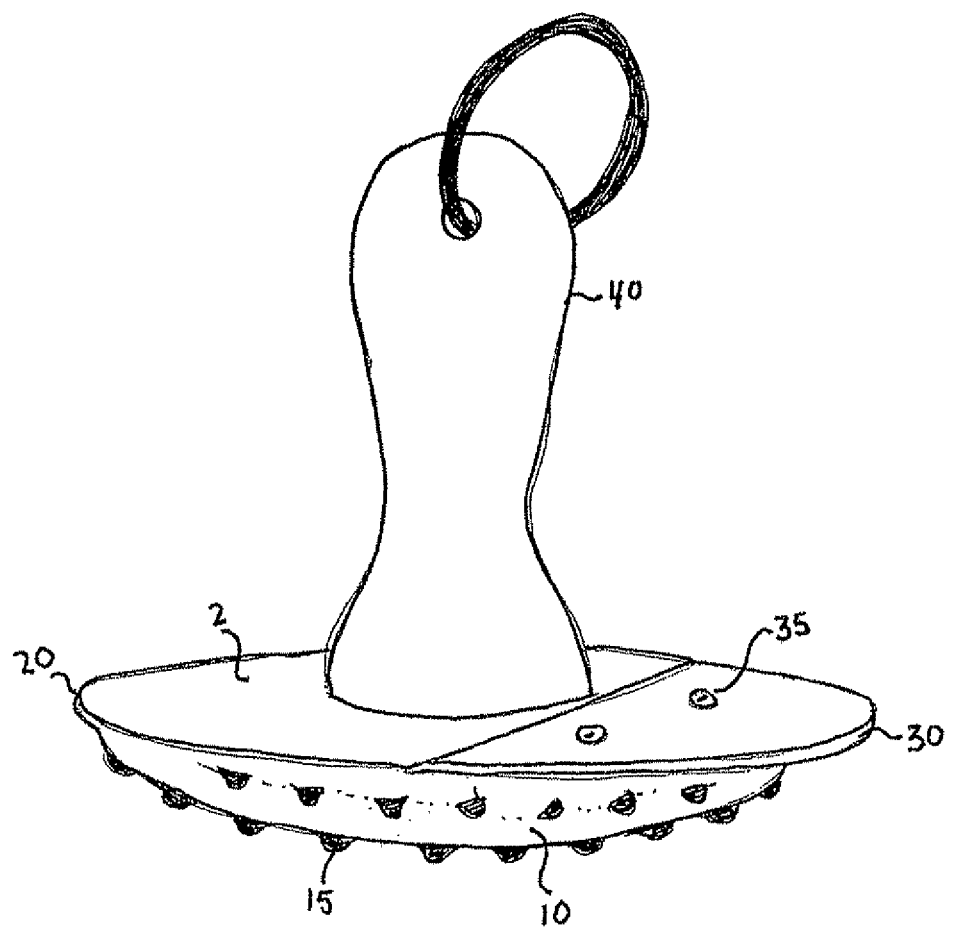
FIG. 7—shows an embodiment of the hand tool, which has raised bumps (15) distributed along the convex pressing surface.

The present invention relates to a hand tool for squeezing, chopping and pureeing food. The hand tool consists of a head (1) having a convex pressing surface (10) for pressing against food and a handle (40) attached to the underside (2) of the head. The handle allows the user to grip the hand tool and exert pressure centrally over the head (1). Any handle position that allows the user to grip the tool without interfering with the squeezing, chopping and pureeing functions is contemplated. At least one curved blade (30) extends radially outward from and is preferably affixed to a section along the underside (2) of the head (1). Preferably, the blade is attached to the underside by screws (35), although any secure means of attachment is contemplated. In certain embodiments, the curved blade (30) may also be affixed to or inserted into the convex pressing surface (10) of the head (1), or formed integrally with the body material of the head (1). The curved blade may follow the shape of the pressing surface and extend outward from 0.25 to 1.5 inches beyond the juncture or the underside and the convex pressing surface. The blade may cover a portion of the underside or alternatively the blade may cover the entire underside and extend beyond the entire circumference of the head. In a preferred embodiment, the convex pressing surface (10) is circular in shape. Non-circular shapes are also contemplated for the head circumference. For example, an oval shaped head circumference is also contemplated. Any convex head that conforms to the side of a colander or bowl is suitable. Preferably the circumference of the head is from about 2.5-6 inches. Most preferably the head circumference is from 3 to 5 inches. In a preferred embodiment the pressing surface is smooth. In an alternative embodiment, smooth rounded raised bumps (15) may be distributed over the convex pressing surface. In yet another embodiment the convex pressing surface is perforated, allowing food to pass through the perforations. Preferably, the stem of the handle is attached to the center of the underside (2) of the head, i.e. the surface opposing the pressing surface. However, the handle can be attached to any point on the head as long as the handle position does not interfere with the pressing, scraping or chopping functions. A scraping edge (20) is formed at the juncture of the convex pressing surface (10) and the underside (2) of the head. Alternatively, the scraping edge can be formed from the same piece of material as the blade and is attached below and parallel to the underside (2). In another embodiment, the scraping edge (20), which is formed at the juncture of the convex pressing surface (10) and the underside (2) of the head, may be further machined to create different or sharper angles. The scraping edge (20) allows the user to scrape food particles from the sides of the cooking bowl or to press food through the holes of a colander.

A variety of materials may be used to create the hand tool. Durable dishwasher safe materials are preferred, as are materials that inhibit microbial growth. The head and the handle can be made from wood, silicone, metal, ceramic, plastic or any combination thereof. The blade can be formed of standard blade materials, such as high carbon steel, high carbon stainless steel, stainless steel, surgical stainless steel, titanium, titanium carbides, plastic and ceramic materials. If the head and blade are formed of the same material the blade can be formed integrally with the head. Alternatively, if the handle is made of the same material as the head it can be formed integrally with the head portion of the tool.

Without further elaboration, it is believed that one skilled in the art can, using the preceding description, utilize the present invention to its fullest extent. The preferred specific embodiments are, therefore, to be construed as merely illustrative, and not limitative of the remainder of the disclosure in any way whatsoever. The preceding embodiments can be repeated with similar success by substituting the generically or specifically described elements of this invention for those used in the preceding embodiments.

The entire disclosure[s] of all applications, patents and publications, cited herein and of corresponding Provisional Application Ser. No. 60/834,332, filed 31 Jul. 2006, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

I claim:

1. A hand tool for squeezing and chopping food comprising a head (1),
having a convex pressing surface (10) and
an underside (2) opposing said convex pressing surface,
a scraping edge (20) formed by the juncture of the convex pressing surface and the underside,
a curved cutting blade (30) attached parallel to the underside of the head, and
a handle attached to the underside (2)
wherein said curved cutting blade is transverse to the handle, wherein said convex pressing surface further comprises smooth raised bumps.

2. A hand tool for squeezing and chopping food comprising a head (1),
having a convex pressing surface (10) and
an underside (2) opposing said convex pressing surface,
a scraping edge (20) formed by juncture of the convex pressing surface and the underside,
a curved cutting blade (30) attached to the underside, and
a handle attached to the underside (2)
wherein said curved cutting blade (30) extends outward from 0.25 to 1.5 inches beyond the scraping edge, wherein said convex pressing surface conforms to the side of a colander or bowl and said curved blade follows the shape of the convex pressing surface.

3. A hand tool for squeezing and chopping food comprising a head (1) formed of molded plastic, wood, silicone, aluminum or ceramic,
having a convex pressing surface (10) and
an underside (2) opposing said convex pressing surface,
a scraping edge (20) formed by the juncture of the convex pressing surface and the underside,
a curved cutting blade (30) formed of high carbon steel, high carbon stainless steel, stainless steel, surgical stainless steel, titanium, a titanium carbide or a ceramic, and
a handle attached to the underside (2)
wherein said curved cutting blade (30) extends outward from 0.25 to 1.5 inches beyond the juncture of the underside and the convex pressing surface and wherein said curved cutting blade is attached to the underside transverse to the direction of pressing force applied to said handle, wherein said convex pressing surface conforms to the side of a colander or bowl and said curved blade follows the shape of the convex pressing surface.

* * * * *